United States Patent [19]

Ames et al.

[11] 3,879,840

[45] Apr. 29, 1975

[54] COPPER DOPED ALUMINUM CONDUCTIVE STRIPES AND METHOD THEREFOR

[75] Inventors: Irving Ames, Peekskill; Francois M. D'Heurle, Ossining; Richard E. Horstmann, Peekskill, all of N.Y.

[73] Assignee: International Business Machines Corporation, Armonk, N.Y.

[22] Filed: Dec. 4, 1972

[21] Appl. No.: 311,578

Related U.S. Application Data

[62] Division of Ser. No. 791,371, Jan. 15, 1969, Pat. No. 3,725,309.

[52] U.S. Cl. ........................ 29/589; 29/626; 357/67

[51] Int. Cl. ............................................. B01j 17/00

[58] Field of Search ............ 29/589, 590, 591, 577, 29/626; 317/234 L; 75/139; 148/185; 117/212, 107

[56] References Cited

UNITED STATES PATENTS

| | | | |
|---|---|---|---|
| 1,658 757 | 2/1928 | Bernhoeft | 75/139 |
| 2,998,555 | 8/1961 | Klossika | 317/234 L |
| 3,382,568 | 5/1968 | Kuiper | 29/590 |
| 3,461,357 | 8/1969 | Mutter | 317/234 |
| 3,465,428 | 9/1969 | Spriggs | 29/590 |
| 3,474,530 | 10/1969 | Ainslie | 29/624 |
| 3,554,739 | 1/1971 | Bickerdike | 75/139 |

*Primary Examiner*—Roy Lake
*Assistant Examiner*—W. C. Tupman
*Attorney, Agent, or Firm*—Bernard N. Wiener

[57] ABSTRACT

This disclosure provides a copper doped aluminum conductive thin film stripe for use as a current-carrying member in a solid state microelectronic configuration which has substantial resistance against circuit failure due to damage caused by current-induced mass transport in the stripe. It has also been discovered for the practice of this invention that the addition of a relatively small amount of copper to an aluminum stripe together with a suitable heat-treatment enhances the extent of its lifetime during current conduction. Preferably, the percentage copper is from the neighborhood of 0.1 percent to the neighborhood of 10 percent by weight composition of copper in the aluminum and with an annealing heat-treatment in the approximate range of 250° to 560°C. However, for certain operational conditions of the stripe a selected percent less than 54 percent copper by weight composition is advantageous.

18 Claims, 28 Drawing Figures

BEFORE SUBJECTING Al STRIPE TO CURRENT

AFTER SUBJECTING Al STRIPE TO CURRENT AT A CURRENT DENSITY OF $2 \times 10^6$ AMPS/$CM^2$ AT A STRIPE TEMPERATURE OF 170°C FOR 223 HOURS BEFORE SUBJECTING $Al + \sim 3\%$ Cu STRIPE TO CURRENT AFTER SUBJECTING $Al + \sim 3\%$ Cu STRIPE TO CURRENT AT A CURRENT DENSITY OF $4 \times 10^6$ AMPS/CM$^2$ AT A STRIPE TEMPERATURE OF 175°C FOR 1242 HOURS 3,879,840

COPPER DOPED ALUMINUM CONDUCTIVE STRIPES AND METHOD THEREFOR

This is a division of application Ser. No. 791,371, filed Jan. 15, 1969, now U.S. Pat. No. 3,725,309.

BACKGROUND OF THE INVENTION

This invention relates generally to a copper doped aluminum conductive stripe and method of fabrication thereof, and it relates more particularly to such an aluminum stripe for a solid state configuration having resistance against current-induced mass transport.

It is necessary for practical solid state microelectronic configurations that thin conductive films be used or interconnection purposes. Heretofore, aluminum stripes have been considerably used for such current interconnection purposes. A serious defect of the commonly used aluminum conductive stripe for interconnection purposes is a microelectronic structure has been the propensity for failure after a not too considerable period of time arising from a current-induced mass transport failure mechanism. During such mass transport in aluminum, there is removal of material from one or more locations in the current path and build-up at one or more other locations in the current path.

Under certain circumstances the underlying physical phenomenon which induces the failure is considered to be electromigration. The term "electromigration" is considered in the art to denote the current-induced mass transport which occurs in a conductive material maintained at an elevated temperature and through which current is passed wherein atoms of conductor material are displaced as a result of the combined effects of direct momentum exchange from the moving electrons and the influence of the applied electric field. Generally, failure is defined to mean that the conductive stripe can no longer serve its intended purpose of interconnecting in a current sense component aspects of the solid state or semiconductor device. The current-induced mass transport phenomenon manifests itself as a partial removal of the material under the influence of the electrical current from one or more locations to a buildup of material at one or more other locations. The removal of material can result directly in an open circuit and the buildup of material can manifest itself directly as a short circuit from the current carrying member to another location via an undesired path created by the built up material. Further, the protective ability of an overlying protective layer such as an encapsulating insulating layer, if used, can be impaired or fractured as a result of the indicated material removal or build-up. This can cause failure to come about as a result of removal of the protection afforded by that protective layer, e.g., failure due to atmospheric corrosion.

The nature of one of the types of failure which is caused by current-induced mass transport was apparently first described in the literature by I. A. Blech et al. in an article entitled "The Failure of Thin Aluminum Current-carrying Strips on Oxidized Silicon," published in *Physics of Failure in Electronics*, Vol. 5, pages 496–505 (1967). The type of failure described in that article is caused by the local diminution of material along the length of current-carrying stripes and is known in the art as "stripe-cracking." General procedures for reducing the current-induced mass transport of material in stripes are presented in copending patent application Ser. No. 613,947, entitled "A Heavy Current Conducting Member," filed Feb. 3, 1967, by N. G. Ainslie et al., assigned to the same assignee, and incorporated herein by reference. Application Ser. No. 613,947 issued on Oct. 28, 1969, as U.S. Pat. No. 3,474,530; and application Ser. No. 835,321, a division thereof divided Nov. 14, 1968, issued as U.S. Pat. No. 3,548,491 on Dec. 22, 1970.

In the prior art, when conducting stripes were required for silicon planar devices and integrated circuits, use was often made of vacuum-deposited thin films of aluminum for forming such stripes. Usually, an appropriate heat-treatment was used to assure the formation of adherent ohmic contacts. In the prior art it is known to be desirable to minimize alloying and penetration of the A1 with the Si wafer during a subsequent glassing encapsulation operation, which took place at about 560°C. This was achieved by adding approximately 3 percent silicon by weight to the aluminum layer prior to the glassing operation. By saturating the A1 layer with sufficient Si to satisfy the solubility limit at about 560°C, the rate of alloying and penetration of the A1 layer with the underlying Si wafer was minimized during glassing.

For the purpose of this invention, the term "microelectronic configuration" is taken to designate either an individual device of solid state nature to which connection is achieved, in part at least, through the use of conductive thin films, or a logic circuit or other configuration which contains active and passive elements of solid state nature and for which inteconnection is achieved, in part at least, through the use of conductive thin films. Specific examples of microelectronic configurations are silicon planar diodes and transistors, and silicon monolithic integrated logic circuits. Other examples are: arrays of such circuits; arrays of semiconductor memory circuits, on the same chip or on separate interconnected chips; arrays of optical sensing semiconductor elements; arrays of magnetic thin film memory elements, thin film transistor circuits, hybrid circuits, etc. Other examples for which this invention is also applicable are metallized glass, plastic or ceramic devices for component use; this also includes the use of thin conductive films on substrates for interconnection to planar devices or circuits.

A background text for the technology of semiconductor devices and integrated circuits is "Integrated Circuits, Design Principles and Fabrication" R. W. Warner, Jr. et al., McGraw - Hill Book Co., 1965. A popular treatment of this subject matter is presented in the book "Transistors and Integrated Circuits" by D. C. Latham, J. P. Lippincott Co., 1966. Descriptions of bipolar and MOS silicon integrated circuits and circuit arrays suitable for the practice of this invention are described in the article by D. H. Roberts, "Silicon Device Technology," *IEEE Spectrum* 5, 101 (February, 1968). Descriptions of integrated circuits suitable for the practice of this invention, which utilize glass encapsulation and solder-terminals, are presented in the article by J. Perri et al., "New Dimensions in IC's Through Films of Glass," *Electronics*, page 108, Oct. 3, 1968. Descriptions of other types of microelectronic configurations in which thin films are used, in part at least, for achieving conductive electrical connection between elements of the configurations may be found in various issues of the *IEEE Journal of Solid State Circuits*.

Background references on current-induced mass transport phenomena in aluminum conductors are:

a. "Current-Induced Mass Transport in Aluminum," R. V. Penny, *J. Phys. Chem. Solids*, Vol. 25, page 335 (1964).

b. "The Failure of Thin Aluminum Current-Carrying Strips on Oxidized Silicon," I. A. Blech et al. *Physics of Failure in Electronics*, Vol. 5, page 496 (1967).

c. "Direct-Transmission Electron Microwave Observations of Electrotransport in Aluminum Thin Films," I. A. Blech et al., *Applied Physics Letters*, Vol. 11, page 15, (Oct. 1967).

A background reference for statistical analysis of failure rate data is the article "Failure Rate Study for the Lognormal Lifetime Mode," L. R. Goldthwaite, *Bell Telephone System Monograph*, 3314.

OBJECTS OF THE INVENTION

It is an object of this invention to provide a current conductive thin film stripe which is resistant against circuit failure arising as a consequence of current-induced mass transport phenomena in this film.

It is another object of this invention to provide a solid state configuration with a current conductive thin film interconnection of aluminum which is resistant against damage due to current-induced mass transport in the film by including in the film copper in percent weight composition approximately in the range of about 0.1 percent to 10 percent.

It is a further object of this invention to provide a microelectronic configuration or device with a current conductive thin film interconnection which is resistant against circuit failure arising as a consequence of current-induced mass transport phenomena in the film.

It is another object of this invention to provide an electrical interconnection in thin film form of aluminum for a microelectronic configuration which is resistant against damage due to current-induced mass transport phenomena by including in aluminum copper in percentage weight composition less than approximately 54 percent.

It is another object of this invention to provide a method of forming a thin film containing copper and aluminum onto a planar silicon wafer which has been processed through all steps prior to metallization in such a manner that deleterious effects are not caused as a result of the presence of copper.

It is another object of this invention to provide an annealing treatment method for a copper-doped aluminum conductive stripe for a microelectronic configuration which beneficially distributes copper within the stripe.

It is another object of this invention to provide a preferred distribution of precipitates of copper dopant in an aluminum interconnection stripe for a solid state microelectronic configuration.

SUMMARY OF THE INVENTION

This invention provides a thin film of aluminum doped with a preferred percentage of copper by weight composition which is resistant against structural changes due to current-induced mass transport of the aluminum. This invention also provides a solid state configuration whose passive electrical interconnection include a film of aluminum doped with copper of a preferred percentage to be resistant against current-induced mass transport of the aluminum.

It has been found to be advantageous for the practice of this invention that there is incorporated in a conductive aluminum film preferably for use in a solid state microelectronic configuration a percentage of copper approximately in the range of about 0.1 to 10 percent by weight composition. Further, it is advantageous to anneal the resultant conductive film of copper-doped aluminum by heat-treatment. Preferably, the heat-treatment is carried out at a temperature and for a period of time sufficient to enhance the resistance of the stripe against current-induced mass transport of the aluminum. A range of temperature that has been found to be advantageous is about 250° to 560°C.

Among the fabrication procedures which can be used beneficially for the practice of this invention is deposition of a copper-doped aluminum film from an electron bombardment evaporation source, whereby a certain amount of copper is ejected from a copper hearth of the source to effect a quantitative doping of the film with a variable quantity of copper. The copper so introduced into the aluminum film enhances the lifetime against failure gated by current-induced mass transport phenomena. The use of an appropriate heat-treatment during or after film deposition further enhances the lifetime of the stripe.

An alternative procedure for fabricating a conductive aluminum film doped in accordance with the practice of this invention with a percentage composition of copper is by means of radio-frequency sputtering which is preferably carried out in conjunction with a suitable heat-treatment operation. The cathode is a composite of aluminum plus copper in the appropriate weight percentages.

Another procedure for fabricating an aluminum film according to this invention is by a sequential vacuum evaporation procedure. The aluminum film in a pure form may first be deposited and thereafter the appropriate precent y weight of copper may be suitably incorporated by a subsequent deposition of copper followed by a heat-treatment which causes the copper to diffuse into the aluminum film.

The foregoing and other objects, features, and advantages of the invention will be apparent from the following more particular description of preferred embodiments of the invention, as illustrated in the accompanying drawings.

DECRIPTION OF THE DRAWINGS

FIG. 2 is a box illustrating the relationship of FIGS. 2A-1, 2A-2, 2B-1 and 2B-2 with each other.

FIGS. 2A-1 and 2A-2 are the top view and FIGS. 2B-1 and 2B-2 are the sectional elevational view of FIGS. 2A-1 and 2A-2, respectively which depicts a portion of a microelectronic configuration including copper-doped aluminum thin film current interconnections according to this invention.

FIGS. 3A and 3B are photographs representative of a stripe which show an aluminum stripe having grains of very large size before (FIG. 3A) and after (FIG. 3B)

having been subjected to the flow of sufficient current to induce "stripe-cracking."

Figures 1, 2, 2A, 2B:
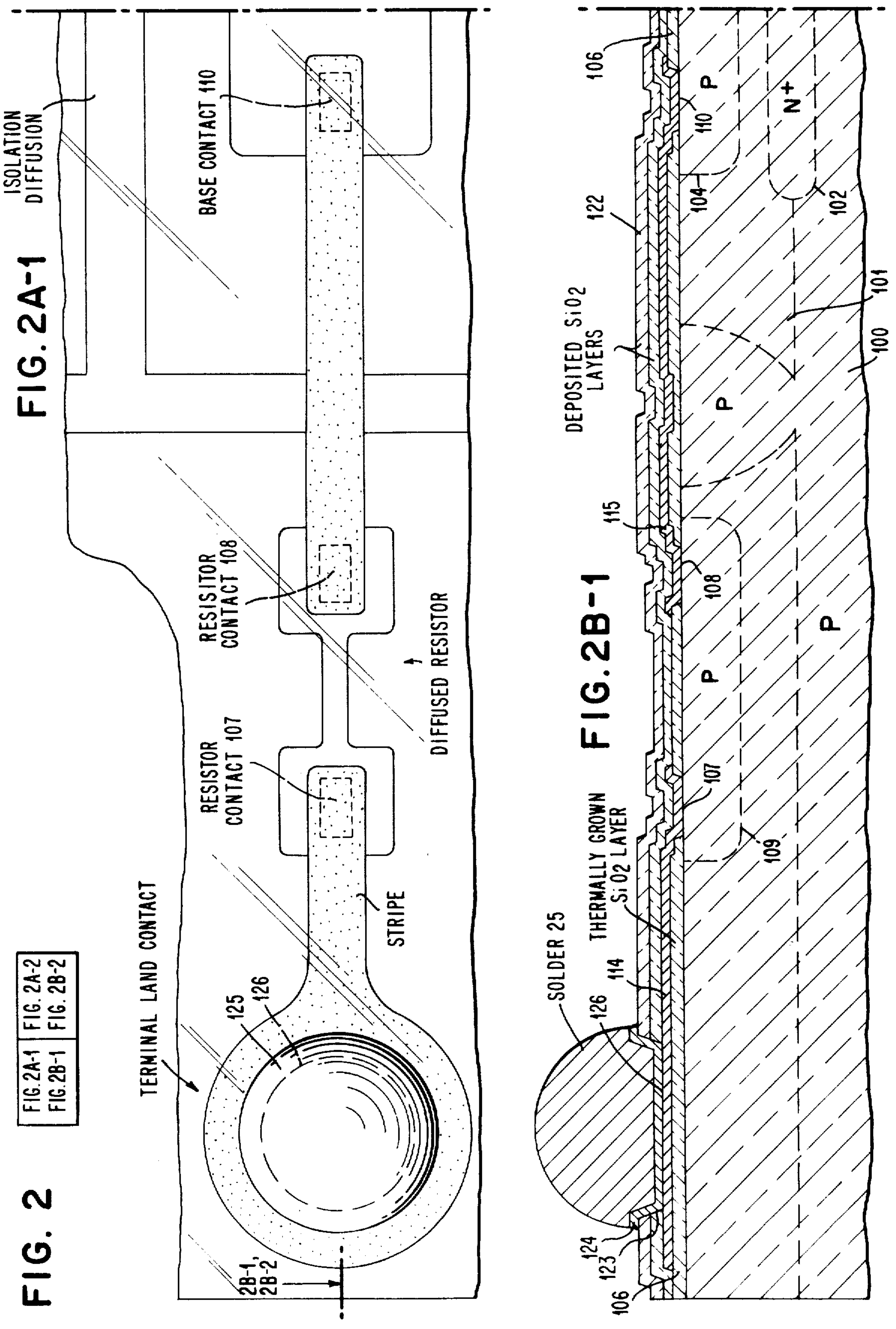
Figures 2, 2A:
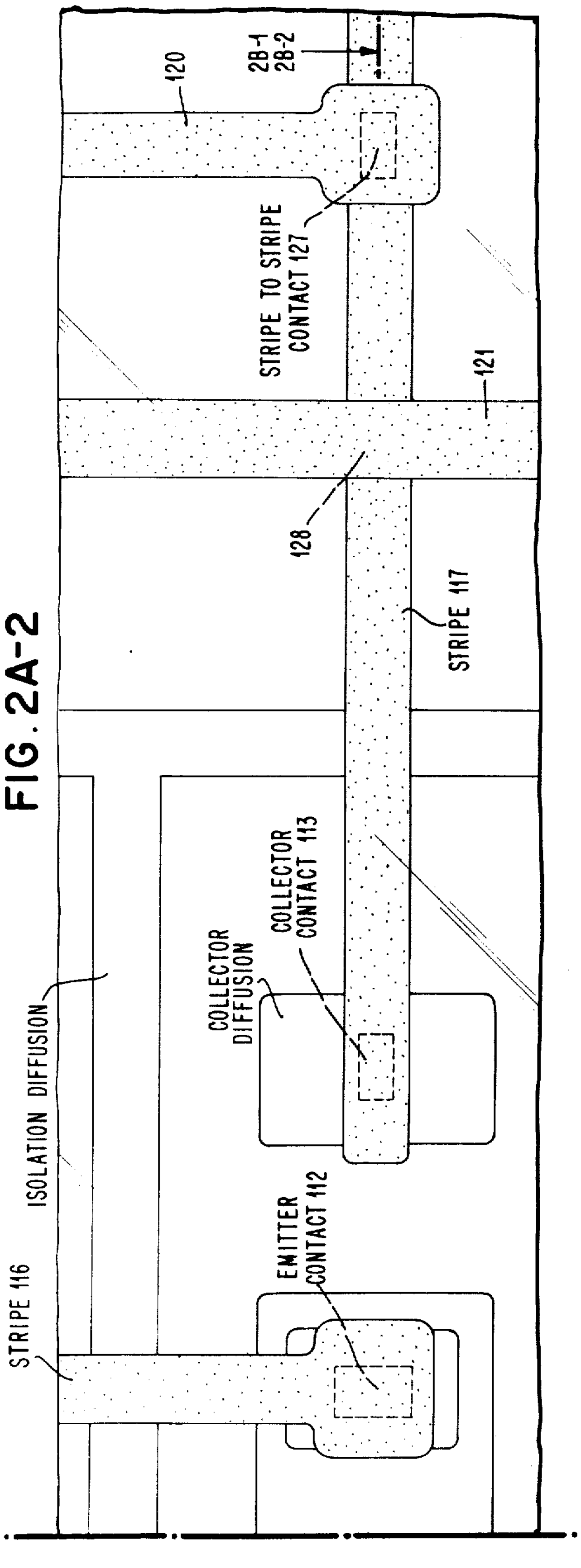
Figures 2, 2B:
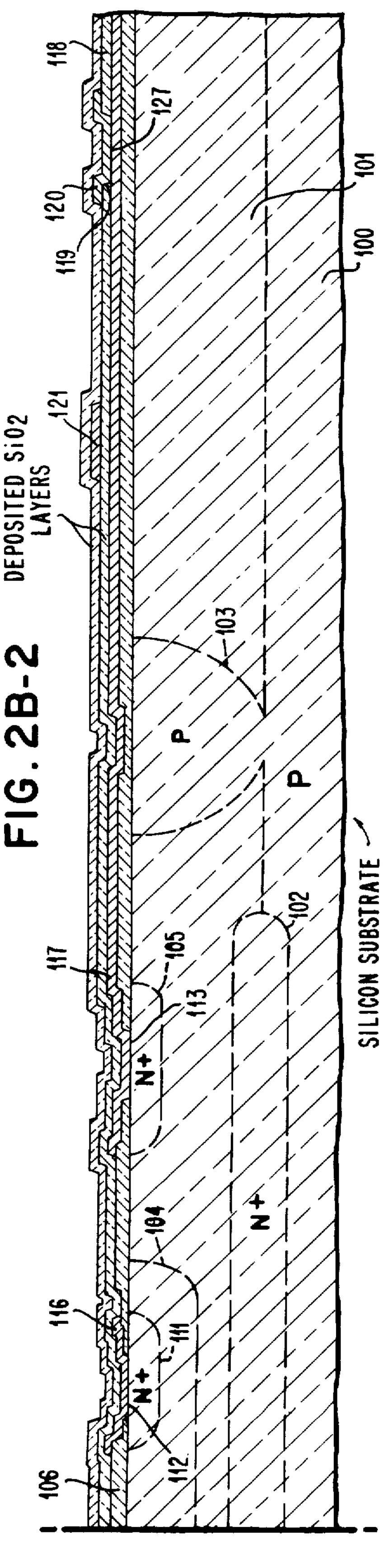
Figure 3A:
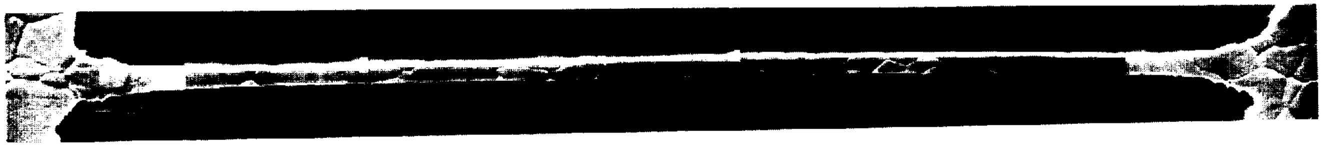
Figures 1, 2, 3, 3B:
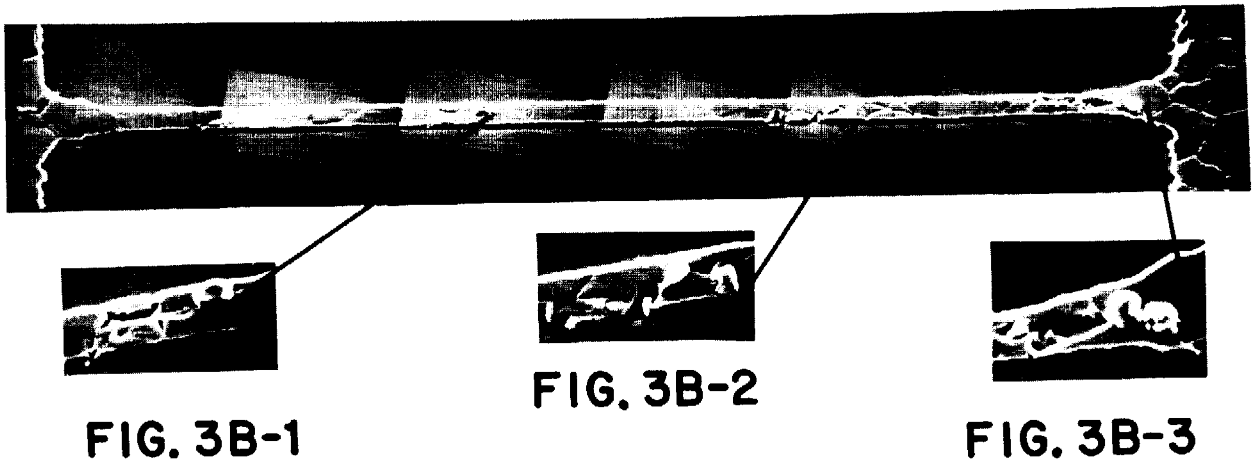

FIGS. 3B-1, 3B-2, and 3B-3 are enlarged views of portions of the stripe of FIG. 3B.

Figure 4:
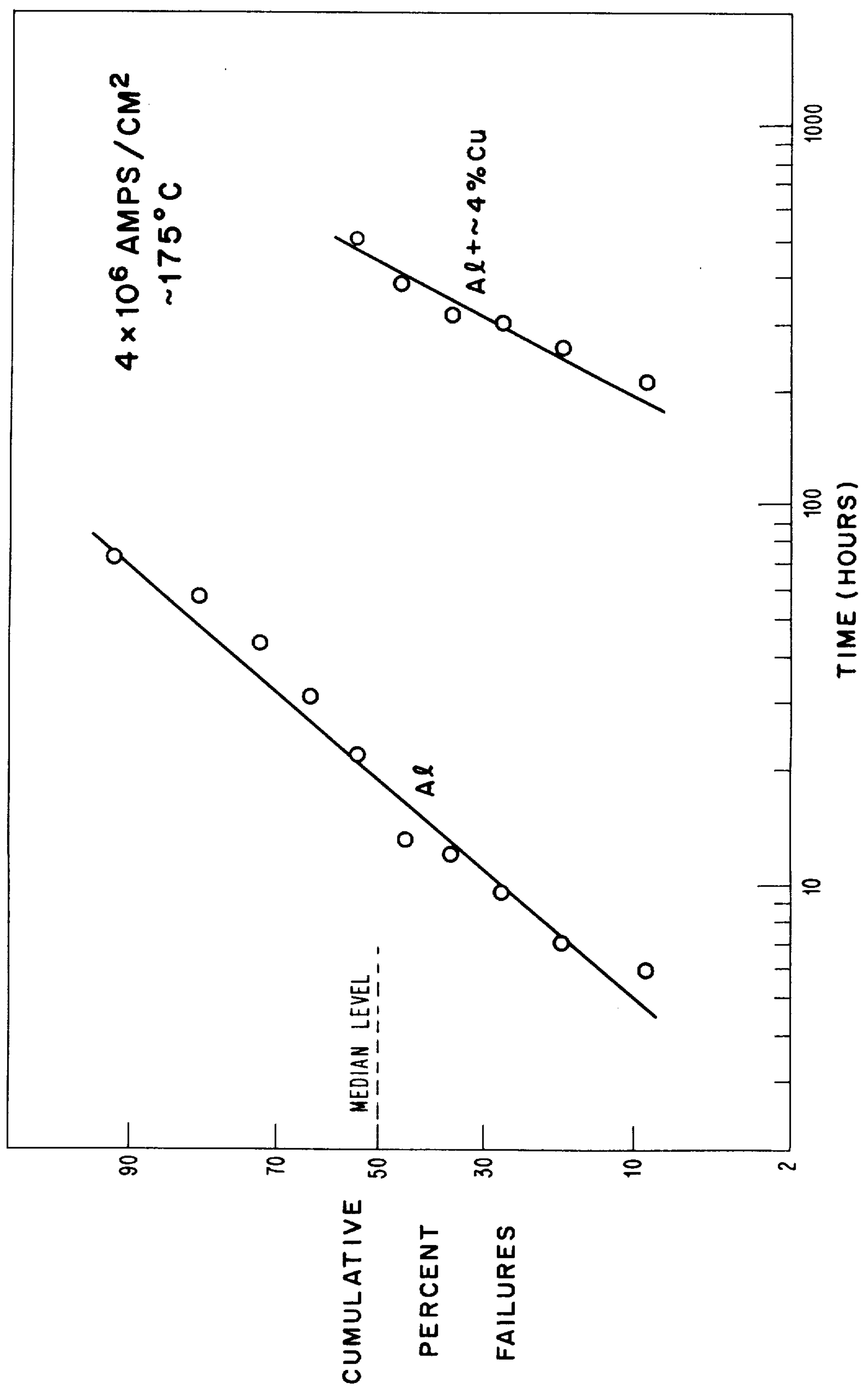

FIG. 4 shows the cumulative percentage failure data as a function of time on a logarithmic scale for (1) a group of similar thin film stripes prepared from the same aluminum thin film (left hand side of figure) and for (2) comparable aluminum stripes which differed from the former only insofar as they contained 4% copper by weight (right hand side of figure).

Figure 5A:
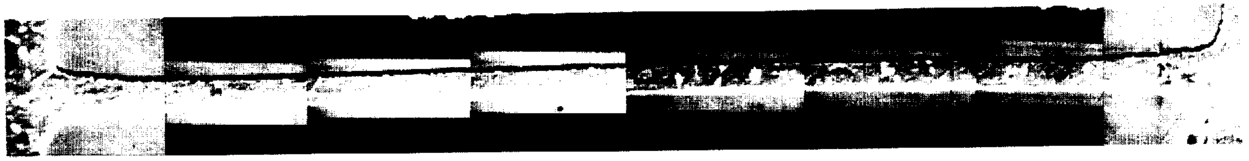
Figures 1, 2, 3, 4, 5, 5B, 6, 7:
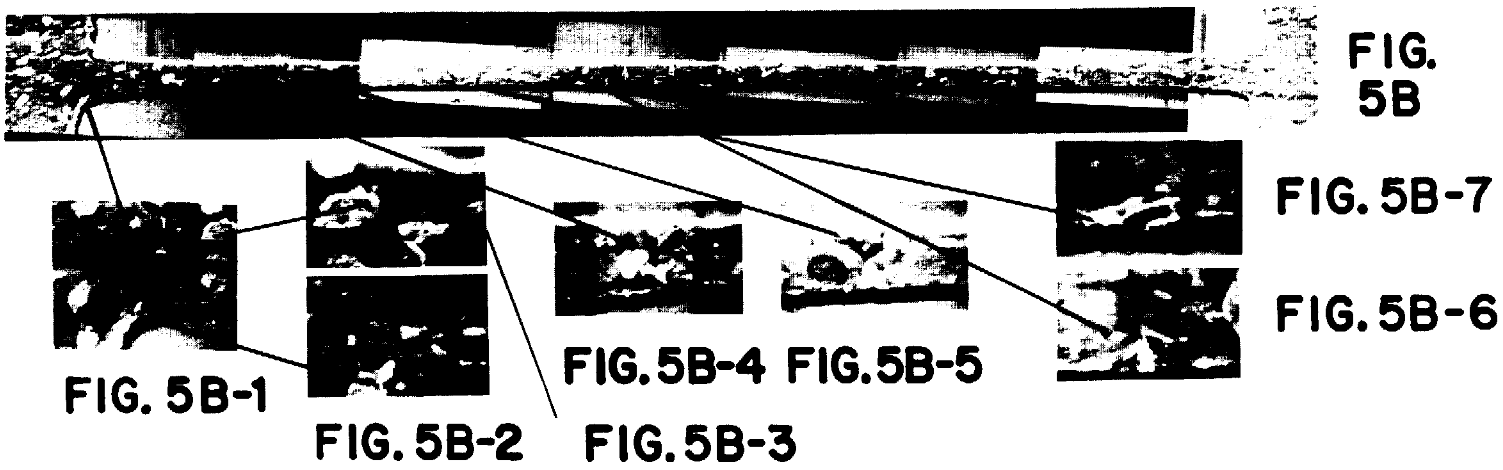
Figure 6:
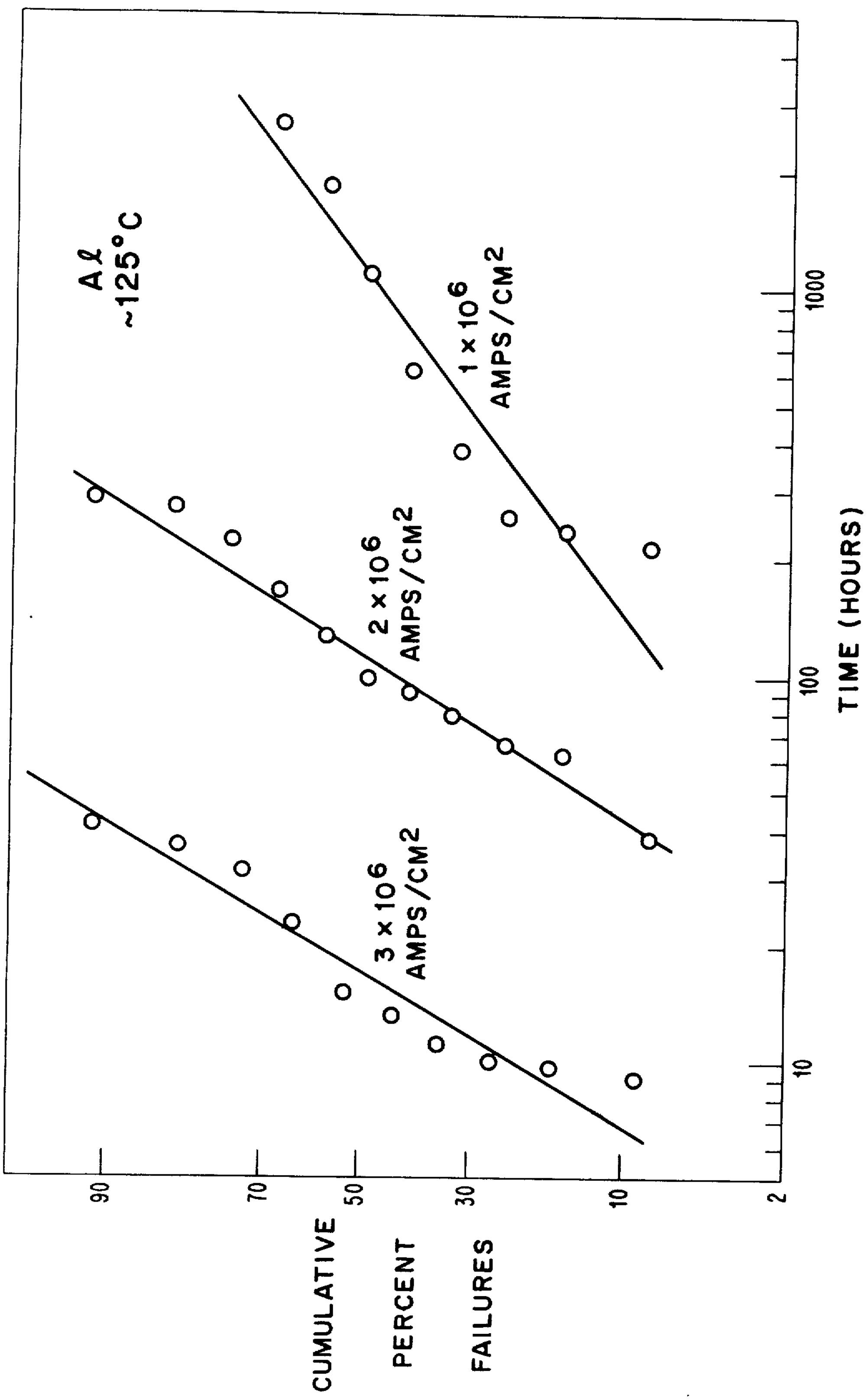
Figure 7:
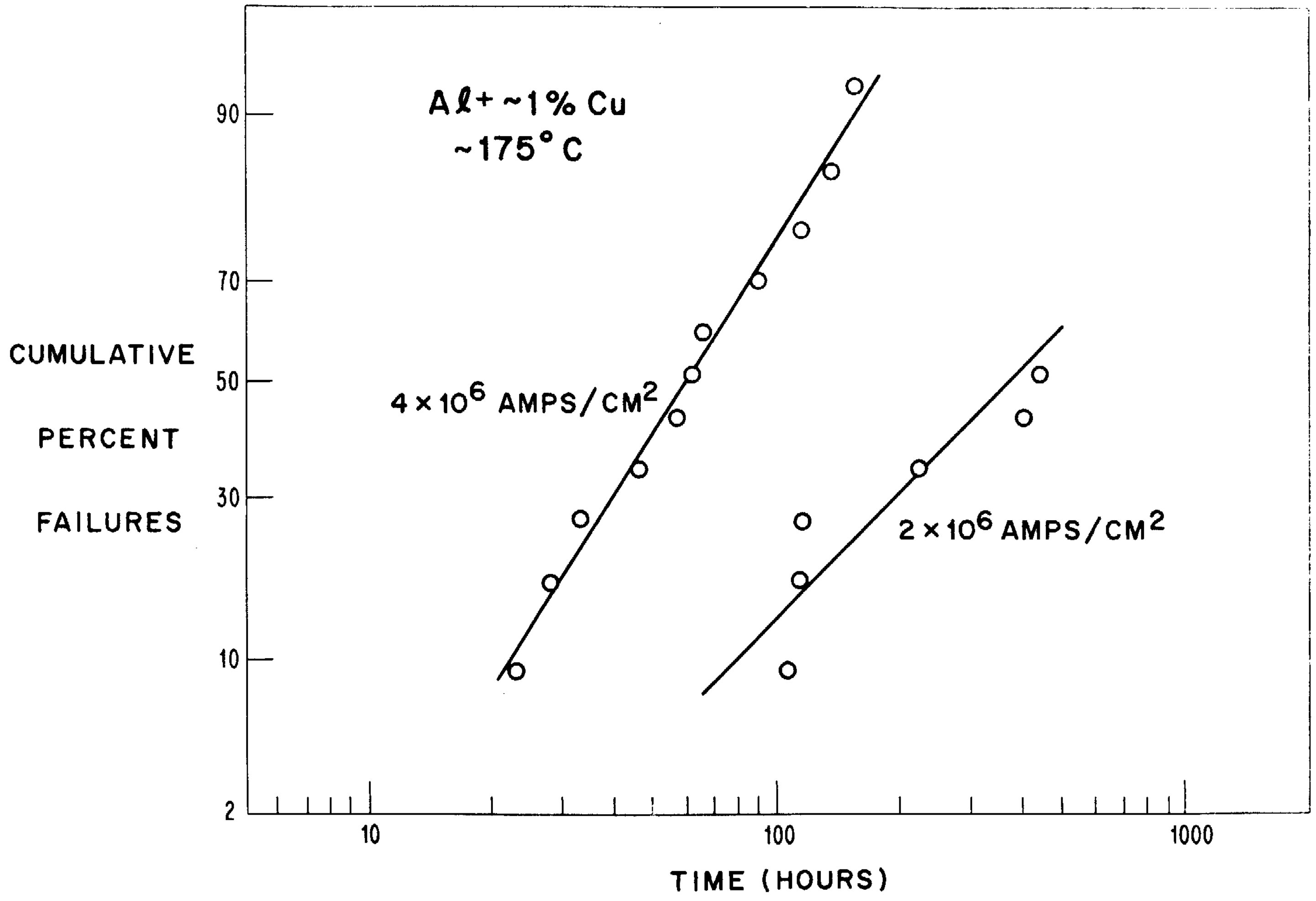

FIGS. 5A and 5B are photographic representations of a very large grain size aluminum stripe doped with 3% copper by weight which respectively, show the appearance of the stripe prior to testing and its appearance after failure as a result of "stripe-cracking."

FIGS. 5B-1, 5B-2, 5B-3, 5B-4, 5B-5, 5B-6, 5B-7 are enlarged views of portions of the stripe of FIG. 5B.

FIG. 6 shows cumulative percentage failure versus time in a logarithmic scale for three separate groups of comparable aluminum stripes which have been subjected to current densities of 3,2 and $1\times10^6$ amps/cm$^2$, respectively, at a stripe temperature of approximately 125°C, and which have experienced current-induced mass transport failure via the "stripe-cracking" failure mode.

FIG. 7 shows cumulative percentage "stripe-cracking" failure time data like FIGS. 4 and 6 for two groups of similarly prepared copper-doped aluminum stripes subjected to different currents.

Figure 8:
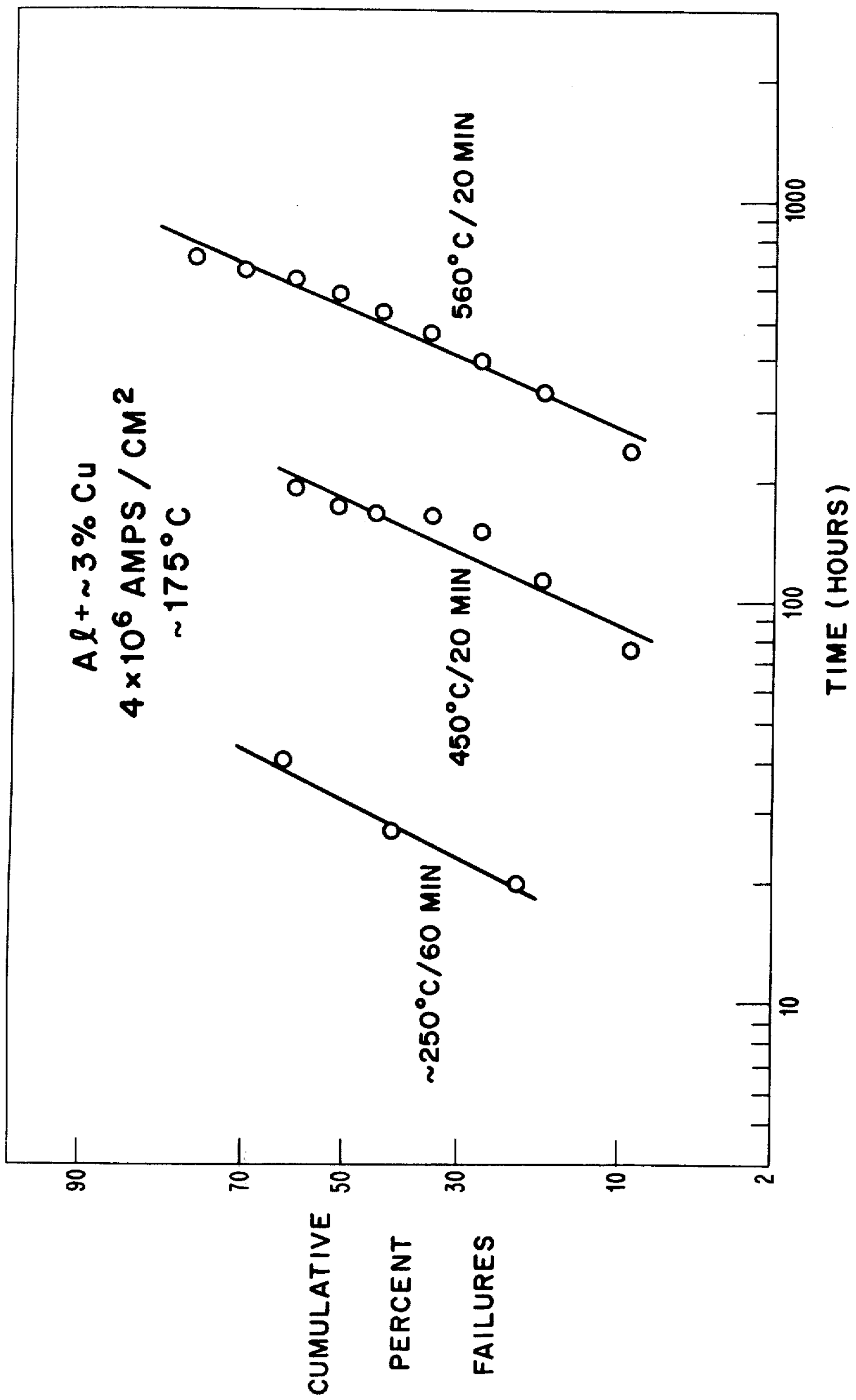

FIG. 8 shows cumulative percentage "stripe-cracking" failure time data like FIGS. 4,6, and 7 for three groups of similarly prepared copper-doped aluminum stripes subjected to different heat-treatments.

Figure 9:
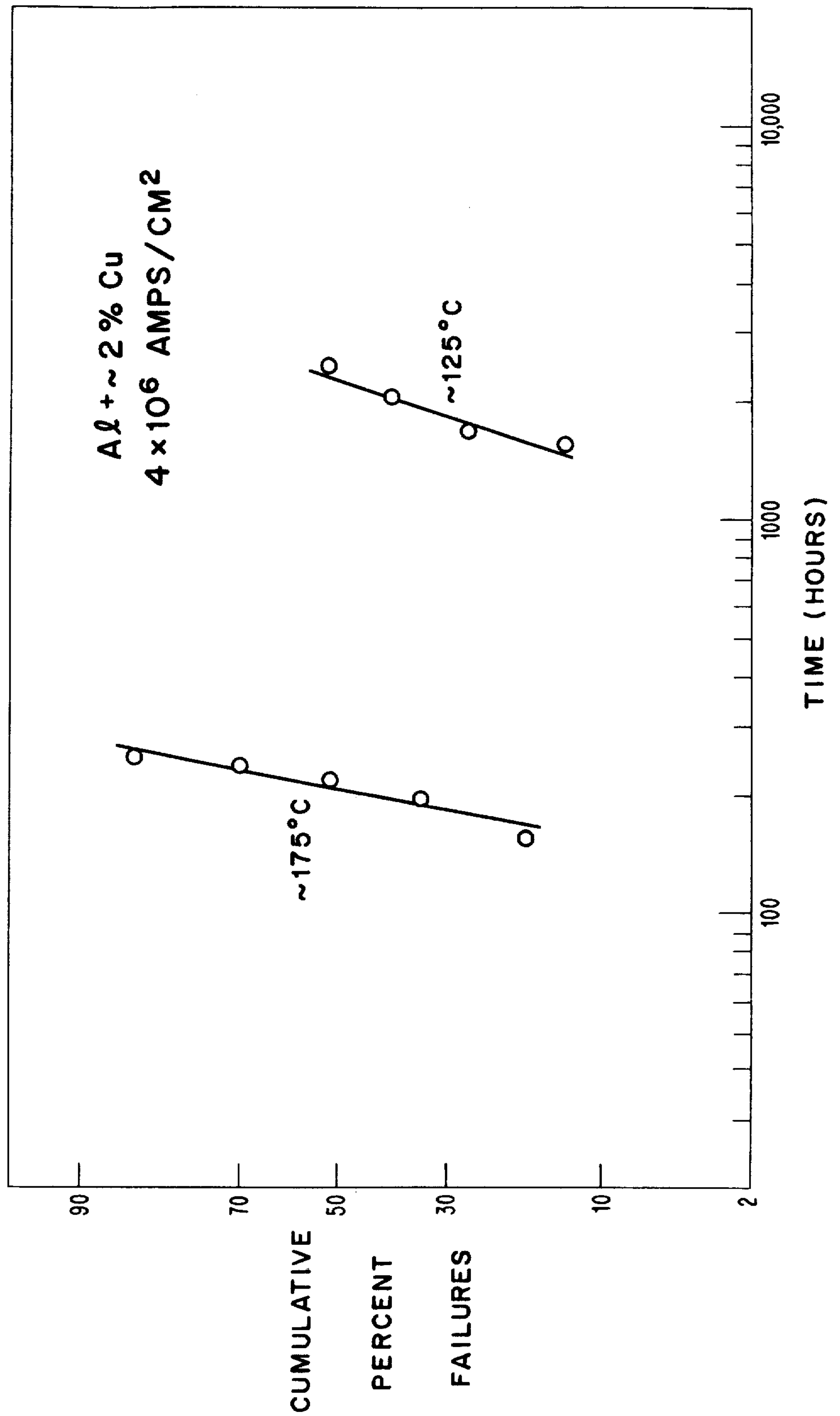

FIG. 9 shows cumulative percentage "stripe-cracking" failure time data like FIGS. 4, 6, 7 and 8 for two groups of similarly prepared copper stripes subjected to different temperatures while being subjected to current.

Figure 10:
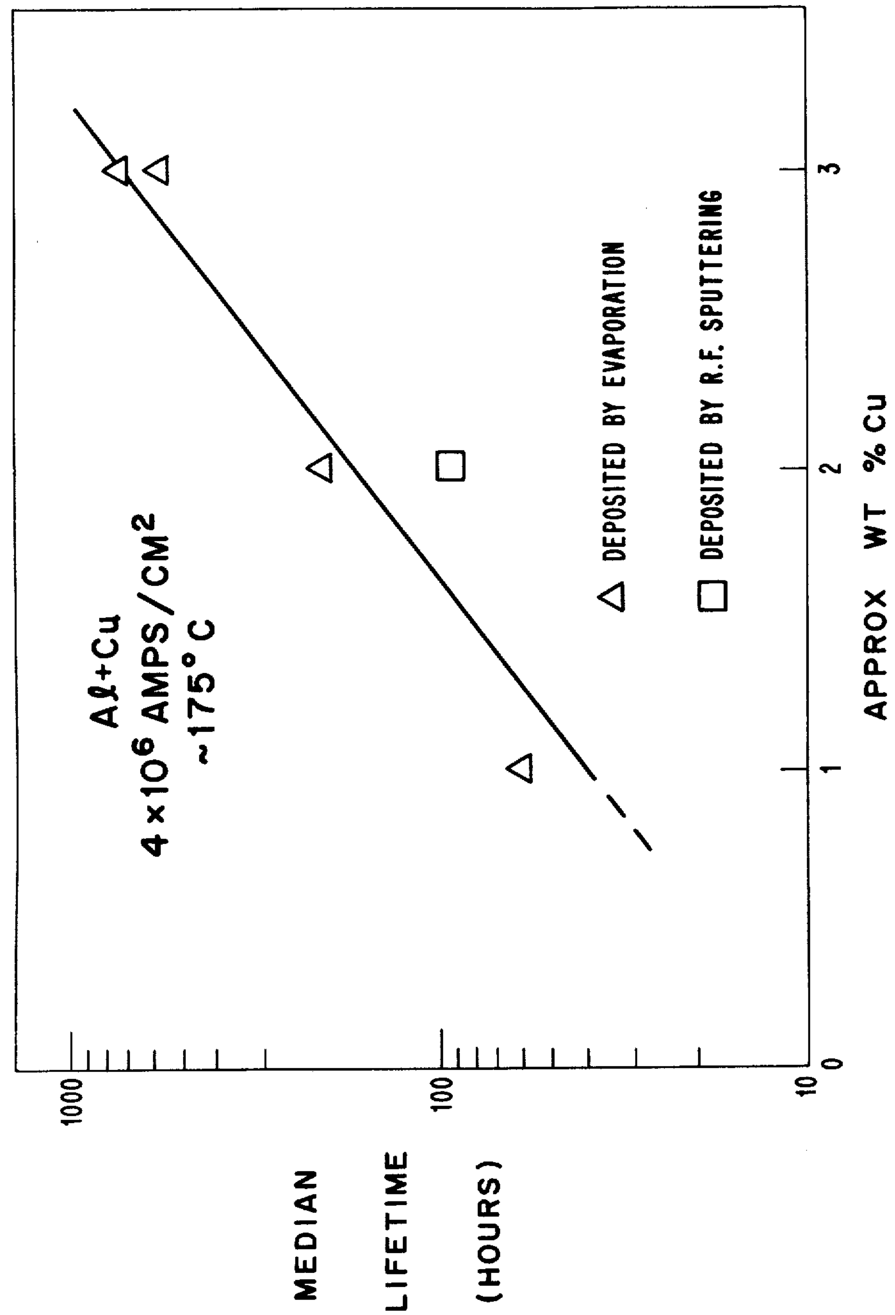

FIG. 10 shows a graph which illustrates the dependence of the midpoint or median lifetime of distributions of the type for which cumulative percentage failure data are shown in FIGS. 4, 6, 7, 8 and 9.

EMBODIMENTS OF THE INVENTION

Figure 1A:
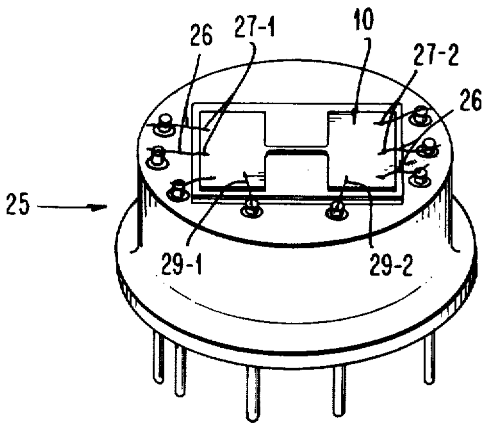
FIG. 1A is a perspective view which illustrates a header suitable for making electrical connections to a stripe located on a substrate.
Figure 1B:
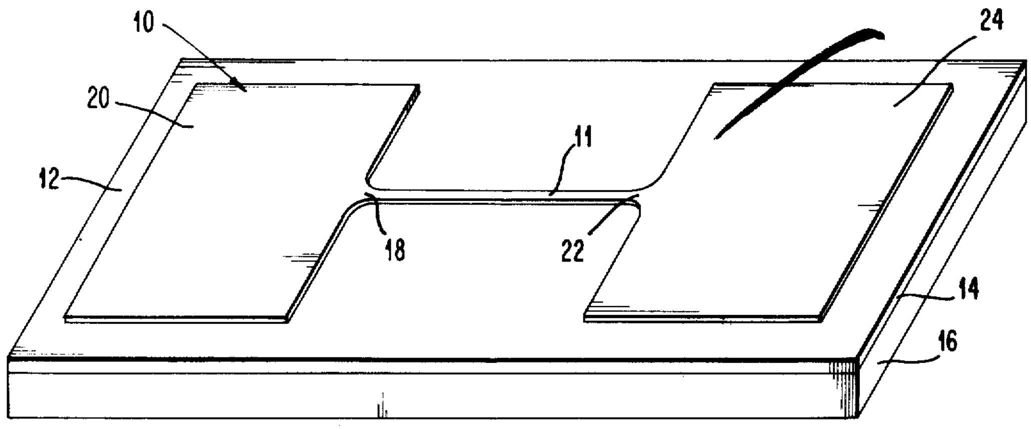
FIG. 1B shows an enlarged view of the stripe of FIG. 1A without the electrical connections thereto.

There will now be described with reference to FIGS. 1A, 1B and 1C the nature and fabrication of a thin film stripe made in accordance with this invention. FIGS. 1A and 1B illustrate a thin film metallization 10 deposited on an insulator surface 12 of insulation layer 14 on a semiconductor substrate 16.

In FIG. 1A, the film 10 and substrate 16 are located on a conventional header mount 25. The reduced portion 11 constitutes the stripe. The stripe 11 is connected at its left extremity 18 to large area land 20 and at its right extremity 22 to large area land 24. The stripe 11 is typically 4000A to 8000A thick which is for example, 0.3 mil wide and ~10 mils long between extremities 18 and 22. The corners at the extremities 18 and 22 are rounded in order to minimize the possibility of failure modes associated with current-induced mass transport of material at the stripe extremities. The land areas 20 and 24 are relatively large (and of the same thickness as the stripe) in order to minimize current-induced mass transport failure modes therein. Several connecting wires 26 are used as external current-carrying leads at wire-to-film contacts 27-1 and 27-2 in order to minimize the possibility of the occurrence of failure modes associated with the current-induced mass transport of material at those contacts. The structure of FIG. 1B is obtained by depositing a conductive film of aluminum or copper-doped aluminum onto the insulating substrate surface 12 and subsequently forming by photoprocessing techniques the indicated pattern of lands 20 and 24 joined to stripe 11 at extremeties 18 and 22.

Figure 1C:
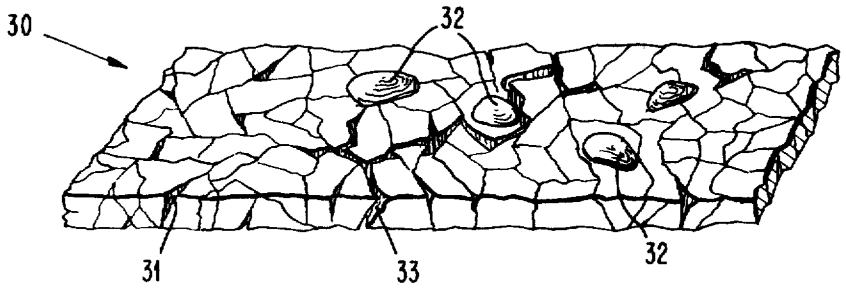
FIG. 1C depicts an idealized perspective view of the metallurgy structure of a stripe according to FIGS. 1A and 1B and illustrates the believed appearance of the effect of current-induced mass transport of aluminum therein.

FIG. 1C illustrates an idealized rendition of a portion of a stripe according to FIG. 1B which has suffered failure along its length as a result of current-induced mass transport phenomena; the rendition was deduced from an electron micrograph replica in region 30. Illustratively, mass transport has effected diminution of aluminum in an all aluminum stripe in a manner which ultimately leads to failure of the stripe, e.g., diminution 31. Further, protrusion 32 is illustrative of the build-up of aluminum above the surface of the stripe 11 concomitant with a diminution elsewhere in the stripe. The particular type of failure mode shown is termed "cracked-stripe" failure mode. The failure causes loss of operation of the conductive path itself and is shown, for example, by crack 33.

FIG. 2 is an illustrative diagram of the relationship between FIGS. 2A-1, 2A-2, 2B-1 and 2B-2.

FIGS. 2A-1 and 2A-2 are top view and FIGS. 2B-1 and 2B-2 are sectional views thereof. The integrated semiconductor structure depicted in these figures contains two levels of interconnecting metallization and solder-like terminals. It is formed by starting with a silicon substrate and performing epitaxial deposition, diffusion and oxidation steps on the substrate in accordance with state-of-the-art procedures. The particular type of circuit shown contains a p-type substrate 100 onto which has been deposited an n-type epitaxial layer 101 and into which has been diffused (by outdiffusion from the p-type substrate 100) a "buried" $n^+$ -type layer 102, (prior to epitaxy) a p-type isolation diffusion 103, a p-type base diffusion 104 or resistor diffusion 109, and an $n^+$- (emitter) diffusion 111 or collector contact diffusion 105. Oxide growth and re-growth together with photoprocessing steps result in formation of a contoured, thermally-grown $SiO_2$ layer 106. Insulating layer 106 can also be formed in whole or in part with silicon nitride, alumina etc. Prior to deposition of the first layer of metallization, contact holes are opened in that layer as indicated by the location of the metallization in contrast with surface portions of the integrated semiconductor structure. Contact holes 107 and 108 are for access to a diffused p-type resistor 109. Contact hole 110 is for access to the p-type base 104 of the bipolar transistor consisting of base 104, emitter 111 and collectors 101, 102, and 105. Contact hole 112 is for access to the $n^+$ -type emitter 111. Contact hole 113 is for access to the upper $n^+$ -type collector contact portion 105 of the collector. Overlying the thermally-grown $SiO_2$ layer 106 and the indicated contacts is the first metallization layer in segments 114, 115, 116 and 117, each formed from the same parent metallization layer through the use of photoprocessing techniques.

Above the first metallization layer is the first deposited insulating layer 118 which is preferably of silicon dioxide but can also be formed in whole or in part of silicon nitride, alumina, etc., deposited, for example, through the use of radio-frequency sputtering techniques. The layer contains via hole 119 for permitting access between the first metallization layer and an overlying metallization layer, which contains segments 120 and 121, which are formed by use of photoprocessing techniques. The segment 121 crosses over the segment 117 and is electrically insulated from it by means of the insulating layer 118. The segment 121 makes electrical contact to the segment 117 through the via hole 119. The overlying $SiO_2$ layer 122 serves primarily as a protective coating (for the underlying layers and semiconductor substrate) against atmospheric chemical attack or corrosion. A contact hole 123 is formed in that layer by photoprocessing through it and insulating layer 118. The overlying terminal land consists of a composite thin film metal layer 124 followed by a ball of solder 125.

Failure of the thin film metallization due to current-induced mass transport may occur in a number of different ways within the indicated microelectronic configuration: One possibility is that failure will occur in the vicinity of the terminal land as a result of build-up or depletion of material at interface 126 as a result of current-induced mass transport (by failure, formation of a direct open or short, is implied, or weakening of the protective bond or protective overlying layer thereby permitting failure by atmospheric chemical attack). Another possibility is that failure may occur at stripe-to-stripe contact 127 for the same reason. Similarly, such failure might occur at the metal-to-silicon contacts 107, 108, 110, 112 and 113. Additional possibilities are that such failures may occur along the lengths of the various stripes 114, 115, 116, 117, 120 or 121. In some cases, failure might occur along the central portions of such stripes or near thermal gradients, near steps in underlying layers, near regions of mechanical stress gradients, near regions of stripe width change, etc. Finally, failure may result through various modes which reflect the contribution from several of the indicated possibilities.

It has been previously shown that composite failure modes associated with material removal at a contact, which prior to going to completion causes a re-routing of current, causes depletion of material and finally failure. This is observed at terminal lands of the type shown, if the difference in diameter between the contact hole and the circular termination of the metallization stripe is relatively small.

In a thin film stripe used as a current-carrying member, the mass transport can cause diminution of material at or in the vicinity of the stripe terminations as well as along the stripe. Additionally, the mass transport can cause build-up in such regions. If there is sufficient dimuntion or build-up there can be ultimately electrical failure in the form of an open or a short. Illustrative of this are the following examples in which:

(1) Open-circuit failure is due to current induced diminution of material somewhere along the length of segment 117 of FIGS. 2A-2 and 2B-2 in a region removed from the contacts of the segment to other elements in the microelectronic configuration.

(2) Open-circuit failure is due to current-induced diminution of segment 121 in a region having a local temperature gradient.

(3) Open-circuit failure of segment 117 is due to current-induced diminution in a region in which segment 117 is relatively thin as a result of film deposition of the second metallization layer onto insulation layer steps such as that above the diffused region 103.

(4) Open-circuit failure is due to current-induced diminution of material at the film-to-film interface located at via hole 119.

(5) Open-circuit failure is due to current-induced diminution of material such as at the emitter, base or collector contacts, as well as at the different resistor contacts.

(6) Short-circuit failure is due to sufficient current-induced build-up of material in segment 117 directly beneath crossover location 128 to cause breakage of insulation layer 118 and subsequent shorting between segment 117 and segment 121.

(7) Open-circuit failure is due to sufficient current-induced build-up of material in segment 121 and at location 128 to cause breakage of protective layer 122 and subsequent material removal from segment 121 in location 128 as a result of atmospheric chemical attack;

(8) Open-circuit failure is due to sufficient current-induced build-up of material at the terminal land interface 126 to cause breakage of layers 118 and 122 and subsequent material removal from the segment 114 in the vicinity of the terminal land interface 126 as a result of atmospheric chemical attack.

Therefore, there are numerous varieties of failure modes resulting from current-induced mass transport phenomena in thin film conductors in a microelectronic configuration.

This invention utilizes copper-doped aluminum stripes or films for the metallization layers or segments of FIGS. 2A-1, 2A-2, 2B-1, and 2B-2 to increase significantly lifetime with respect to failure due to current-induced mass transport phenomena.

PRACTICE OF THE INVENTION

The apparatus usually required for fabricating a Cu doped Al thin film metallization stripe for the practice of this invention is a film deposition chamber, a photoprocessing facility and a heat-treatment furnace. Illustratively, the film is deposited directly onto an appropriate substrate. If vacuum evaporation is used, the film is deposited; directly by evaporation (possibly to completion) from a melt which contains the parent Al material plus the desired Cu material addition, or by co-evaporation, e.g., via use of several sources, of the former and the latter, or by a sequential deposition whereby the Al material is deposited first and then the Cu material addition or additions are deposited subsequently in a prescribed manner. Additionally copper may be added through use of an electron-bombardment evaporation source which has a water-cooled copper hearth; the operational parameters of the source are maintained at a level sufficient to cause some evaporation of copper during the evaporation of the Al parent material.

One useful procedure is the "sandwich" structure; the Cu material addition is deposited as one or more alternating layers between two or more layers of the Al. Thereafter, the Cu of the sandwich is diffused appropriately into the Al by heat-treatment.

The radio-frequency sputtering procedure described by P. Davidse et al., *J. Appl. Phys.*, Vol. 37, page 574, (1966) is appropriate for deposition of the composite material whereby Al plus Cu are incorporated in the cathode.

The addition of approximately 3 percent of Si to Al films in order to retard alloying at the Al-to-Si contact in planar Si devices in which Al is utilized for circuit interconnections may, if desired, be added via the same procedures described above.

Film deposition, e.g., at a substrate temperature of 200°C during deposition, is carried out first and is followed by a heat-treatment for approximately several minutes to 1 hour in an inert atmosphere, e.g., $N_2$, at an optimum temperature, e.g., between approximately 250° and 560°C if planar silicon semiconductor devices or integrated circuits are to be metallized for electrical interconnection purposes.

If satisfactory adhesion to an oxidized silicon substrate is desired, as in the case of metallization of planar silicon semiconductor devices or integrated circuits, some Al should be present in the initial portion of the deposition. Adhesion will be assured if the composition of the incident evaporant is mostly aluminum and the silicon substrate is maintained at a temperature of approximately 200°C during film deposition.

Suitable photoprocessing procedures for the practice of this invention are described in the text book "Integrated Circuits, Design Principles and Fabrication," by R. W. Warner, Jr. et al., McGraw-Hill Book Co., 1965.

EXAMPLES OF THE INVENTION

As an example of the practice of this invention, it is advantageous to use a stripe configuration of the type shown in FIGS. 1A and 1B for which the likelihood of the occurrence of all failure modes but the mode referred to as "stripe-cracking," can be sufficiently reduced through appropriate procedures. The data from such stripes indicates that the mass transport takes place primarily along grain boundaries and that the "stripe-cracking" failure mode occurs from a net removal of material from a preferred site, often in a grain boundary, followed by an enhanced rate of removal due to the decrease in effective electrical cross section which results from the material removal. Although this particular type of failure mode is found to occur in local regions along a relatively thin film stripe, the presence of macroscopic temperature gradients, terminals or changes in stripe dimension can perturb the appearance of the failure and accelerate its occurrence under suitable conditions.

With thin films deposited with a high degree of control and subsequently photoprocessed, annealed and tested with extreme care for the practice of this invention, the detailed nature of the failure and the physical events which precede it are not readily apparent. This is corroborated by the idealized electron microscope replica in FIG. 1C which shows a current-induced "crack" along a typical 0.3 mil Al stripe. As can be seen, the "crack" appears as a fine, connected integranular network of depletions which appear to have formed in a somewhat random fashion.

The stripes of a group were immersed in an oil bath and connected to resistors of 22 ohm values; the stripe-resistor combinations are connected in parallel to a constant voltage power supply. The bath temperature was selected to give the desired stripe temperatures, corrected for self-heating. The measured temperatures were accurate to within ± 5°C during a typical run.

In order to present a more detailed characterization of the nature of the "crack," a 0.3 mil wide Al stripe having an unusually large grain size, approximately in the range of the stripe width were prepared. FIGS. 3A and 3B show scanning electron microscope images of such a stripe before (FIG. 3A) and after (FIG. 3B) subjecting it to the flow of sufficient current to induce "stripe-cracking." FIG. 3B depicts the stripe after it was subjected for 223 hours to a current density of 2 × $10^6$ amps/cm$^2$ at a temperature of 170°C. FIG. 3B suggests that failure occurred as a result of material removal in the vicinity of grain boundaries and in a manner which appears to have favored the preferential removal of material along crystallographic directions. Localized pile-ups of material are usually found somewhere in the vicinity of the depletions downstream of the electron flow.

FIG. 4 is a graph which illustrates the cumulative percentage failure data for "stripe-cracking" in a group of similar Al thin film stripes prepared from the same parent Al thin film. The stripes were prepared from Al films deposited by means of vacuum evaporation from a radio-frequency heated BN-$TiB_2$ evaporation source of the type described by I. Ames et al. in *Rev. Sci. Instr.* Vol. 37, page 1737 (1966). The substrates were of the type described in conjunction with FIGS. 1A and 1B and were maintained at a temperature of 200°C during film deposition. Stripe configurations of the type shown in FIGS. 1A and 1B were then produced from the films by photoprocessing. The films were then heat-treated at 530°C in nitrogen for 20 minutes and prepared using the header 25 shown in FIG. 1A. An oxide coated, silicon semiconductor chip of 75 mils by 75 mils supporting the stripe was bonded to the header 25 of FIG. 1A by conductive epoxy. Electrical power was connected to each stripe by 0.7 mil diameter gold wires bonded to the aluminum areas or by 1 mil diameter aluminum wires bonded thereto.

The resistance of each stripe was obtained through current measurements with the use of wires 26 and voltage measurements by means of wires 29-1 and 29-2. The average temperature rise of a stripe at high current levels was estimated by using it as its own resistance thermometer. Typically, the temperature rise obtained for a 0.3 mil × 10 mil × 5000A stripe on a 75 mil by 75 mil silicon chip having a 1000A thick oxide film was about 5°C above ambient, e.g., 80°C, for a current density of 2 × $10^6$ amps/cm$^2$.

FIG. 4 also presents data for comparable copper doped aluminum stripes which differ from the Al stripes as they contain 4% copper by weight. The copper was introduced by depositing the film in the form of a "sandwich" whereby an aluminum layer was deposited first, followed by a thin copper layer, followed by an overlying aluminum layer. As in the case of the Al stripes used for the left-hand portion of the data of FIG. 4, a heat treatment at 530°C for 20 minutes in nitrogen was used prior to subjecting the stripes to the flow of a current at a current density of 4 × $10^6$ amps/cm$^2$ at a stripe temperature of 175°C. The median lifetime shows a marked increase from a value of approximately 20 hours in the case of the undoped stripe to approximately 400 hours in the case of the doped stripe, an increase by approximately a factor of 20 in the median lifetime.

FIGS. 5A and 5B, like FIGS. 3A and 3B, show scanning electron microscope images of large grain type copper doped aluminum stripes having a grain size approximately in the range of the stripe width which were obtained before (FIG. 5A) and after (FIG. 5B) failure of such a stripe (copper content of approximately 3 percent by weight). The copper was introduced by separately depositing a copper layer above the aluminum film and causing the copper film to diffuse into the aluminum through the use of the combined effects of exposure to an elevated substrate temperature of 500°C during film deposition and a subsequent heat treatment of 560°C for 20 minutes in nitrogen. The stripe failed after 1242 hours at a current density of 4 × $10^6$ amps/$cm^2$ and a stripe temperature of 175°C. This is in sharp contrast to the undoped aluminum stripe of FIGS. 3A and 3B which was prepared in a comparable manner, which failed in 223 hours at a current density of 2 × $10^6$ amps/$cm^2$ and a stripe temperature of 170°C.

FIG. 6 shows illustrative cumulative percent failure data versus log of failure time for three groups of comparable aluminum stripes which have been subjected to current densities of 3, 2, and 1 × $10^6$ amps/$cm^2$ respectively, at a stripe temperature of approximately 125°C and have experienced current-induced mass transport failure via the "stripe cracking" mode. The failure of these stripes is shown to be dependent in the value of FIG. 10 shows a graph which illustrates the dependence of the midpoint or median lifetime of distributions of the type for which cumulative percentage failure data are shown in FIGS. 4, 6, 7, 8 and 9. This illustrates that increasing copper content causes an increase in lifetime with respect to stripe cracking. The stripes of this figure were subjected to a current density of 4 × $10^6$ amps/$cm^2$ at a stripe temperature of about 175°C. These stripes were annealed at a temperature of about 560°C for about 20 minutes prior to the application of current. Some of the stripes of this graph were formed by evaporation and some by R.F. sputtering.

Table I illustrates median lifetimes with respect to "stripe-cracking" of comparable aluminum and copper-doped thin film stripes of dimensions described in connection with FIGS. 1A and 1B. The stripes were subjected to a current flow at a current density of 4 × $10^6$ amps/$cm^2$ and a stripe temperature of approximately 175°C. As can be seen, the table indicates that (1) median lifetime increases with increasing copper content and (2) median lifetime increases with increasing annealing temperature.

TABLE I

Illustrative median lifetimes of comparable Al and Al + % Cu thin film metalization stripes tested at current density 4 × $10^6$ amps/$cm^2$ and temperature ~175°C. All depositions were made onto oxidized Si substrates which were maintained at a temperature of ~200°C during film deposition.

| Deposition Technique | Stripe | Annealing Temperature | Median Lifetime |
|---|---|---|---|
| Evaporation via electron bombardment evaporation | Al | 560°C | ~ 10 hrs. |
| | Al+ ~1% Cu | 560°C | ~ 60 hrs. |
| | Al+ ~3% Cu | 560°C | ~550 hrs. |
| | Al+ ~3% Cu | 450°C | ~200 hrs. |
| | Al+ ~3% Cu | 250°C | ~ 30 hrs. |
| Evaporation of Al via BN crucible, evaporation of Cu via Mo crucible | Al | 560°C | ~ 10 hrs. |
| | Al+ 18 2% Cu | 560°C | ~200 hrs. |
| Evaporation of Al via BN-$TiB_2$ crucible; evaporation of Cu via Mo crucible | Al | 530°C | ~ 20 hrs. |
| | Al+ ~4% Cu | 530°C | ~400 hrs. |
| R.F. sputtering via selected cathodes | Al | 560°C | ~ 3 hrs. |
| | Al+ 2-3% Cu | 560°C | ~ 90 hrs. |

the current density at the stripe temperature of 125°C.

FIG. 7 shows cumulative percentage "stripe-cracking" failure time data like FIGS. 4 and 6 for two groups of similarly prepared copper-doped aluminum stripes subjected to different currents. The amount of copper was approximately 1 percent by weight. As shown in FIG. 6, the failure of these stripes is shown to be dependent on the value of the current density.

FIG. 8 shows cumulative percentage "stripe-cracking" failure time data like FIGS. 4, 6, and 7 for three groups of similarly prepared copper-doped aluminum stripes subjected to different heat-treatments. The stripes contain approximately 3 percent Cu and were subjected to a constant current density of 4 × $10^6$ amps/$cm^2$ at a constant stripe temperature of about 175°C. The difference in failure from group to group is due to the different annealing conditions (temperature and time).

FIG. 9 shows cumulative percentage "stripe-cracking" failure time data like FIGS. 4, 6, 7 and 8 for two groups of similarly prepared copper stripes subjected to different temperatures while being subjected to current. In this illustration, the different stripe temperatures reflected different failure times for each of the two groups.

METALLURGY OF THE INVENTION

In order to implement the teachings of this invention, certain metallurgical considerations should be taken into account regarding the metallurgical properties of aluminum, copper and other materials which may be associated in the particular embodiment being utilized For embodiments in which only the properties of the aluminum-copper metallurgical system need be considered, guidance may be obtained from standard phase diagrams for the aluminum and copper system such as those contained in the text by M. Hansen, "Constitution of Binary Alloy Systems" published by McGraw-Hill (1958). Such phase diagrams show that copper can be combined with aluminum by formation of $Al_2Cu$ until an amount of copper equal to approximately 54 percent by weight of the resulting aluminum-copper composite. Upon reaching that level of copper addition, a suitable heat-treatment involving elevation of the temperature of the composite material converts all of the composite to the intermetallic compound $Al_2Cu$. Further, the aluminum-copper phase diagram shows that undesirable localized melting occurs for heattreatments at temperatures above 548°C if more than 5.7 percent by weight copper is present in the aluminum. If the copper content in the aluminum lies between 0 and 5.7 percent, the maximum annealing temperature, which is compatible with the requirement that localized melting does not occur, decreases from 660°C, corresponding to the zero percent level to 548°C, corresponding to a copper concentration of 5.7 percent.

When aluminum films are utilized for interconnection purposes in silicon devices or integrated circuits, thermal treatments during or subsequent to the deposition of the aluminum film onto the underlying silicon substrate have usually been restricted to temperatures below 577°C. Otherwise, localized melting would take place, causing deleterious effects in the films and in the underlying silicon devices. When copper is present in the aluminum m etallization, according to the teaching of this invention, this upper limit on temperature is reduced. Illustratively for an amount of copper greater than 5.7 percent by weight this limiting temperature is lowered to approximately 524°C.

When copper-doped aluminum stripes of this invention are used for planar semiconductor structures, such as a silicon integrated circuit, the possibility of deleterious effects of copper penetration into underlying junctions may present a problem. Copper diffuses quite rapidly into silicon at temperatures normally encountered in device fabrication. Copper forms a series of exothermic compounds with aluminum which make it substantially more difficult for the copper to dissolve into the silicon in the presence of aluminum than would otherwise be possible. Illustratively, the heat of formation of $Al_2Cu$ per mole of Cu is from the literature −9750 calories. Since the heat of solution of pure copper into silicon is endothermic, the heat of solution for solution of copper into silicon from an $Al_2Cu$ source of copper is increased by 9750 calories. Therefore, the copper of a copper-doped aluminum stripe for the practice of this invention does not easily dissolve into silicon.

To assure formation of a reliably adhesive bond between the composite aluminum-copper film and the underlying semiconductor substrate, it is desirable that the initial portion of the deposition be predominantly of aluminum. A substrate temperature between about 200° and 300°C is usually adequate to assure satisfactory adhesion of copper-doped aluminum films to microelectronic structures such as illustrated in FIGS. 2A-1, 2A-2, 2B-1 and 2B-2.

Although it is usually advantageous to use uniform copper doping throughout the deposited aluminum film for the practice of this invention, non-uniform doping is also advantageous for certain applications. Illustratively, (1) a copper gradient may be introduced along the film thickness, and (2) different percentages of copper doping may be included in different layers of a stripe.

One problem with the addition of copper to aluminum is that the corrosion resistance of the composite film may be decreased.

This problem can be addressed by the following methods. One procedure is to subject the composite material to the proper heat-treatment to effect distribution of aluminum copper precipitate in such a way as to limit the undesirable effect of the copper addition. In certain cases it is desirable to add a small percentage (0.1–0.25 percent) of chromium to decrease stress corrosion. By coating the stripe with a pure aluminum, after the proper heat treatment has been given to the aluminum copper composite, in such a way that the part of the stripe which is exposed to a corrosive environment consists of aluminum helps reduce the corrosive problem.

THEORY OF THE INVENTION

Studies of mass transport in fine wires are useful in understanding certain aspects of this invention. H. Huntington, et al. *J. Phys. Chem. Solids*, Vol. 20, page 76 (1961) and R. Penney, *J. Phys. Chem. Solids*, Vol 25, page 335 (1964) have described current-induced marker motion in bulk conductors. A "wind" force is exerted by conduction electrons through momentum transfer to the atoms of the conductor. An opposite force due to the effect of the electric field on the ionized atomic cores is small and according to certain authors is non-existant in metallic conductors. The mass flow is a net directional flow which is superimposed on the random diffusion type of atomic motion which characterizes the thermodynamic equilibrium state of the conductor.

Phenomenologically, the number of atoms crossing a square centimeter of a conductor per second is expressed as:

$$J_a = \frac{ND}{kT} Z^* eE \qquad (1)$$

where $N$ is the number of atoms of Al per cubic centimeter; $D$ is the self-diffusion coefficient; $e$ is the electronic charge; $E$ is the electric field; $k$ is Boltzmann's constant; $T$ is the absolute temperature; and $Z^*$ is an empirical parameter which characterizes the net force on an Al atom in terms of an effective number of electronic charges on the atom in the electric field E.

The failure times shown in FIG. 4 range around some median failure time with a distribution which, at least for the purpose of characterizing the failure associated with groups of about 10 stripes, may be characterized by a "log-normal" distribution of the type described by L. R. Goldwaite in *Bell Telephone System Monograph* 3,314. The widths of the distribution of failure times for such groups of stripes is typically such that the failure times between the first and last members of a group differ by as much as an order of magnitude which indicates that this failure mode has a complex nature. However, it is possible to characterize the median failure times of comparable stripes as a result of "stripe-cracking" in terms of the stripe current and the stripe temperature by the expression:

$$\tau(j,T) \; \alpha \; f(j) \, e^{\phi(j)/kT} \qquad (2)$$

in which $f(j)$ is a decreasing function of $j$. The term $\phi(j)$ is an effective activation energy which characterizes the contribution of several of the thermally activated processes which contribute to the current-induced failure and consists mainly of the activation energy of self-diffusion at a current density sufficiently high that current-induced mass transport takes place in a pronounced manner. In accordance with the discovery for the practice of this invention, $\tau(k,T)$ may be increased through the use of appropriate copper additions and associated heat-treatments and this increase apparently includes an increase in the $\phi(j,T)$.

The increase in $(j,T)$ at fixed values of $j$ and $T$ which occurs upon the introduction of copper into aluminum stripes is shown in FIG. 10.

CONSIDERATIONS FOR THE INVENTION

It is also part of this invention that the wire-to-film contacts on typical aluminum stripes of the type shown in FIGS. 1A and 1B are prone to failure through current-induced mass transport phenomena. Such failure has been found to be such that the failure time is proportional to $(\text{current})^{-1}$, in accordance with the expectation from theory, based on Equation (1). Additionally, it has been observed for the practice of this invention that such failures are less likely to occur for wire-to-film contacts when the aluminum film is doped with copper. Thus, introduction of copper into such films retards current-induced mass transport failure in both the film and in the region of the film to wire contacts.

For certain operational circumstances it is desirable to have other additives in addition to copper present in aluminum stripes. The addition of 3 percent silicon to aluminum for the purpose of retarding alloying effects during the glassing operation for a planar device is described above. Although it may be desirable to introduce an additive for an operational purpose, e.g., for structural strength or corrosion resistance which may degrade somewhat the beneficial influence of copper on stripe lifetime, the degradation may be insufficient to negate the use of the additive. For example, long life stripes were made of an aluminum alloy known to the industry as "2024" (which contains 4.5 percent Cu) having 1.5 percent Mg and 0.6 percent Mn (by weight). Table II contains lifetime data with respect to the "stripe-cracking" type of failure mode for stripes produced from Al and Al alloys which illustrate this point. The films were prepared using radio-frequency sputtering and stripes of the type described in connection with FIG. 1A and 1B were used for obtaining the indicated lifetime data.

Hence, a very small percentage of copper by weight in aluminum permits the use of copper-doped aluminum stripe at temperature approaching the melting point of aluminum (660°C).

For some applications of this invention, it is advantageous to provide stripes resistant against failure from current-induced mass transport of material by providing stripes either of copper-doped gold or of copper-doped silver.

Further, stripes of the alloy known in the industry as "6061" consisting of 0.25 percent Cu, 1.0 percent Mg, 0.6 percent Si, and 0.2 percent Cr in addition to being resistant to failure as described herein can also be fabricated and annealed without depressions or bumps being formed on the surface thereof.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a method for increasing the operational lifetime of a microelectronic configuration comprising a solid state device in combination with a given current conductive stripe connected to said device for supplying current thereto wherein failure of operation of said microelectronic configuration occurs through current-induced mass-transport in said given stripe, the steps of fabricating said given stripe as another stripe comprising an alloy of aluminum with copper additive in the amount of about 0.1 to about 54 percent by weight and having a minimum physical dimension of less than 0.001 inch, and connecting said another stripe to said device for supplying said current thereto, whereby said microelectronic configuration has said increased operational lifetime because said another stripe is more resistant to said current-induced mass-transport than is said given stripe.

TABLE II

| Alloy Type | Additives (wt %) | Annealing Temp (in°C) | Median Lifetime (in hrs.) at $2\times10^6$ amps/cm$^2$ and ~175°C |
|---|---|---|---|
| Al (pure) | none | 560 | |
| Al Alloy 2024 | 4.5%Cu, 0.6% Mn, 1.5%Mg | 560 | >9000 |
| " | " | 450 | " |
| Al Alloy 6061 | 0.25%Cu, 1.0%Mg, 0.6%Si; 0.2%Cr | 560 | >1600 |
| " | " | 450 | " |
| Al Alloy 5052* | 2.5%Mg, 0.25%Cr | 560 | > 500 |

*This long life alloy is believed to contain a very small amount of copper of about 0.1% or less.

This invention also provides for special substrates deposition temperatures for fabricating a copper-doped aluminum stripe which is resistant against failure due to current-induced mass transport of aluminum. By varying the substrate temperature upward to a sufficiently high level, a level is reached which sufficiently distributes the copper in the aluminum during stripe deposition without a requirement for subsequent annealing to distribute the copper.

For certain microelectronic structures, the fabrication temperatures therefor or the ambient temperature may be sufficiently high to make desirable a concomitant high temperature for a copper-doped aluminum stripe. The melting temperature of the stripe imposes an upper limit on the tolerable temperature therefor.

2. Method as set forth in claim 1 wherein said connecting step occurs during said fabricating step.

3. Method as set forth in claim 2 including an annealing step which occurs during said connecting step to enhance the electrical connection of said another stripe to said solid state device.

4. Method of claim 1 wherein said stripe is formed by evaporating the components thereof.

5. Method of claim 2 wherein said evaporating of said components of said stripe is sequential with respect to said aluminum and said copper.

6. Method of claim 1 wherein said stripe is formed by sputtering the components thereof.

7. Method of claim 1 including the step of annealing said stripe.

8. Method of claim 7 wherein said annealing step is carried out in a temperature range of about 250° to about 560°C.

9. Method of claim 1 wherein said aluminum alloy includes silicon additive in the amount of about 0.1 to about 3 percent by weight.

10. Method of claim 1 including the step of:

fabricating said another stripe by diffusing said copper additive into said given stripe.

11. Method as set forth in claim 1 wherein said solid state device comprises a silicon semiconductor device and said given stripe comprises aluminum.

12. Method as set forth in claim 11 wherein said connecting step occurs during said fabricating step.

13. Method as set forth in claim 11 including the step of annealing said stripe.

14. Method as set forth in claim 13 wherein said annealing step is carried out in a temperature range of about 250° to about 560°C.

15. A method for increasing the operational lifetime of a microelectronic configuration comprising the steps of:

establishing a microelectronic configuration comprising a solid state device in combination with a given current conductive stripe connected to said device for supplying current thereto wherein failure of operation of said microelectronic configuration occurs through current-induced mass-transport in said given stripe fabricating said given stripe as another stripe comprising an alloy of aluminum with copper additive in the amount of about 0.1 to about 54 percent by weight and having a minimum physical dimension of less than 0.001 inch, and connecting said another stripe to said device for supplying current thereto whereby said microelectronic configuration has said increased operational lifetime because said another stripe is more resistant to said current-induced mass-transport than is said given stripe.

16. Method as set forth in claim 15 wherein said solid state device comprises a silicon semiconductor device and said given stripe comprises aluminum.

17. In a method for increasing the operational lifetime of a microelectronic configuration comprising a solid state device in combination with a given current conductive stripe connected to said device for supplying current thereto which is operative at high enough current density to cause an aluminum stripe to fail through current-induced mass-transport in said aluminum stripe, the steps of fabricating said given stripe as a stripe comprising an alloy of aluminum with copper additive in the amount of about 0.1 to about 54 percent by weight and having a minimum physical dimension of less than 0.001 inch, and connecting said stripe to said device for supplying said current thereto.

18. The method of claim 17 wherein said solid state device comprises a silicon semiconductor device.

* * * * *